(12) United States Patent
Casey et al.

(10) Patent No.: US 11,046,717 B2
(45) Date of Patent: Jun. 29, 2021

(54) LESS CORROSIVE ORGANOBORON COMPOUNDS AS LUBRICANT ADDITIVES

(71) Applicant: VANDERBILT CHEMICALS, LLC, Norwalk, CT (US)

(72) Inventors: Brian M. Casey, Norwalk, CT (US); Vincent J. Gatto, Bradenton, FL (US)

(73) Assignee: VANDERBILT CHEMICALS, LLC, Norwalk, CT (US)

( * ) Notice: Subject to any disclaimer, the term of this patent is extended or adjusted under 35 U.S.C. 154(b) by 0 days.

(21) Appl. No.: 16/844,039

(22) Filed: Apr. 9, 2020

(65) Prior Publication Data

US 2020/0361964 A1 Nov. 19, 2020

Related U.S. Application Data

(60) Provisional application No. 62/849,427, filed on May 17, 2019.

(51) Int. Cl.

| C07F 5/04 | (2006.01) |
| C10M 139/00 | (2006.01) |
| C10N 30/06 | (2006.01) |
| C10N 30/10 | (2006.01) |
| C10N 40/25 | (2006.01) |
| C10N 30/00 | (2006.01) |
| C10N 30/12 | (2006.01) |

(52) U.S. Cl.
CPC .............. *C07F 5/04* (2013.01); *C10M 139/00* (2013.01); *C10M 2227/062* (2013.01); *C10N 2030/06* (2013.01); *C10N 2030/10* (2013.01); *C10N 2030/12* (2013.01); *C10N 2030/66* (2020.05); *C10N 2040/252* (2020.05)

(58) Field of Classification Search
CPC .......... C10M 139/00; C10M 2227/062; C10N 2030/06; C10N 2030/10; C10N 2030/12; C10N 2030/66; C10N 2040/04; C10N 2040/25; C10N 2040/252; C07F 5/04

See application file for complete search history.

(56) References Cited

U.S. PATENT DOCUMENTS

| 2,992,994 | A | 7/1961 | Albrecht et al. |
| 3,155,465 | A | 11/1964 | De Gray et al. |
| 4,389,322 | A | 6/1983 | Horodysky |
| 7,598,211 | B2 | 10/2009 | Karol et al. |
| 7,897,549 | B2 | 3/2011 | Karol et al. |
| 8,486,876 | B2 * | 7/2013 | Brewer ................ C10M 133/16 508/551 |

FOREIGN PATENT DOCUMENTS

| DE | 1061966 B | 7/1959 |
| EP | 0183478 A2 | 6/1986 |

* cited by examiner

*Primary Examiner* — James C Goloboy
(74) *Attorney, Agent, or Firm* — Norris McLaughlin, P.A.

(57) ABSTRACT

A borate ester represented by the following formula:

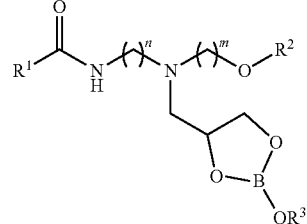

where $R^1$ is a hydrocarbon chain, $R^2$ and $R^3$ are independently either a hydrogen atom or a hydrocarbon chain, and m and n are independently from 1 to 5.

13 Claims, No Drawings

LESS CORROSIVE ORGANOBORON COMPOUNDS AS LUBRICANT ADDITIVES

BACKGROUND OF THE INVENTION

Field of the Invention

This invention involves the development of less corrosive, high performing organoboron compounds with applications as additives in lubricants. Lubricants containing these compounds should demonstrate improved performance with respect to friction reduction, wear protection, and copper and lead corrosion. In particular, it is desired to have organoboron compounds which function as antioxidant, friction modifier and/or anti-wear additives in diesel and passenger car engine oil applications where high performing, more durable additives are required in terms of oxidative and hydrolytic stability.

The class of compounds in the present invention may be represented in the following formula:

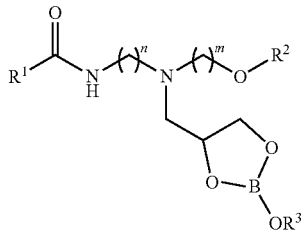

where $R^1$ is a hydrocarbon chain and $R^2$ and $R^3$ are either a hydrogen atom or a hydrocarbon chain. The $R^1$ group consists of an unsaturated, and/or saturated, and/or branched hydrocarbon chain containing 1 to 21 carbon atoms. It is preferred that the $R^1$ group is unsaturated or branched. It is further preferred that the $R^1$ group is both saturated and branched. It is also preferred that the $R^1$ group consists of a hydrocarbon chain containing 11 to 21 carbon atoms. The $R^2$ and $R^3$ groups can each be a hydrogen atom or a linear, cyclic, or branched hydrocarbon chain containing 1 to 20 carbon atoms. The number of methylene spacer groups (n and m) are each independently from 1 to 5. It is preferred that the number of methylene spacer groups (n and m) are each independently 2 or 3.

This class of compounds can be prepared via General Reaction Scheme I:

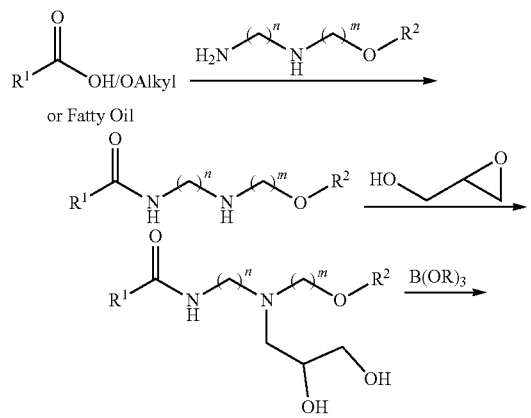

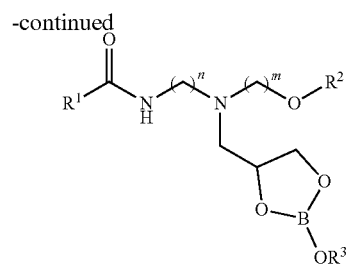

Discussion of the Prior Art

Traditional organic friction modifiers, such as glycerol monooleate, are susceptible to both oxidation and hydrolysis when used as additives in engine oil applications. As a result, these additives and their degradation products can lead to erosions in performance and/or corrosion (i.e. copper and/or lead). The invention disclosed herein should meet or surpass the friction reduction of traditional additives while also providing significant improvements in copper and lead corrosion as determined by the High Temperature Corrosion Bench Test. Furthermore, organoboron compounds are multifunctional lubricant additives providing improved antioxidancy, friction reduction, and wear protection performance.

U.S. Pat. Nos. 4,389,322, 7,897,549, and 7,598,211 describe organoboron compounds and lubricant compositions containing them. The inventive class of compounds are chemically distinct and outside the classes described in U.S. Pat. Nos. 4,389,322, 7,897,549, and 7,598,211. In addition, the organic component used to produce the organoboron compounds described in U.S. Pat. Nos. 7,897,549 and 7,598,211 consist of both an organic amide and an organic ester. The inventive class of compounds contains only organic amide-derived compounds. As a result, inventive examples from this class of compounds are expected to benefit from improved hydrolytic stability.

Examples of the ligands used to prepare this class of compounds are contained within DE1061966 and JP35012097. However, neither DE1061966 nor JP35012097 describe any subsequent reactions of these ligands with boron. Furthermore, the preparations of neither unsaturated nor branched examples of N-[2-[(2,3-dihydroxypropyl)(2-hydroxyethyl)amino]ethyl]-alkylamides are discussed. The scope of the ligands used in the preparation of the class of organoboron compounds in the present invention has also been expanded to include N-[3-[(2,3-dihydroxypropyl)(3-alkoxypropyl)amino]propyl]-alkylamides. Furthermore, neither DE1061966 nor JP35012097 describe applications for examples related to the inventive class of compounds in lubricants as additives for friction modification or wear protection.

DE 1061966 describes preparation of 2,3-dihydroxy compounds related to the ligands of the present invention by reacting intermediate alkylamide, N-[2-[(2-hydroxyethyl)amino]ethyl]- with α-chlorohydrin or epichlorohydrin. This process can require the use of cystic bases and generates halogenated waste. In the invention presented herein, intermediate alkylamide amines were reacted instead with glycidol in the presence of ethanol. These reactions benefit from being completely atom economical and generate no waste. The ethanol can be separated from the reaction by simple distillation and recycled into the process.

SUMMARY OF THE INVENTION

The inventive examples represent a new class of additives capable of meeting or exceeding the antioxidant, frictional, and/or wear performance of traditional additives while significantly reducing the severity of the observed copper and lead corrosion. This inventive class of compounds is particularly useful in both passenger car motor oil and heavy-duty diesel engine oil applications where high performing, more durable friction modifier and/or anti-wear additives are required in terms of oxidative and hydrolytic stability.

DETAILED DESCRIPTION OF THE INVENTION

In the first step, a carbonyl-containing compound such as a carboxylic acid, carboxylic acid ester, or triglyceride is reacted with a mixed primary/secondary amine-containing compound to form a secondary amide. In the second step, the secondary amide intermediate is reacted further with glycidol to furnish a 2,3-dihydroxypropyl adduct. The second step can be performed in the presence of a protic solvent such as methanol or ethanol to improve the reaction efficiency. In the third step, the glycidol adduct is reacted with a boron source such as boric acid in the presence of water. The reaction mixture containing the boron complex can be diluted with process oil resulting in the final organoboron product.

As highlighted above, the class of compounds in this invention may also be described as the reaction products of an organic ligand and a boron source performed in the presence of water. The organoboron-containing product can be diluted with process oil. The relative ratios of the organic ligand, the boron source, and the process oil can be varied such that the final organoboron product contains between 0.05 and 2.0% boron by weight. More preferably, the final organoboron product contains between 0.1 and 1.0% boron by weight. The organic ligand can be described as the reaction products of a carboxylic acid or ester or triglyceride, a mixed primary/secondary amine-containing compound, and glycidol. Non-limiting examples of the organic ligand used in the preparation of the organoboron compounds of this invention include the following:

N-[2-[(2,3-dihydroxypropyl)(2-hydroxyethyl)amino]ethyl]lauramide
N-[2-[(2,3-dihydroxypropyl)(2-hydroxyethyl)amino]ethyl]myristamide
N-[2-[(2,3-dihydroxypropyl)(2-hydroxyethyl)amino]ethyl]palmitamide
N-[2-[(2,3-dihydroxypropyl)(2-hydroxyethyl)amino]ethyl]stearamide
N-[2-[(2,3-dihydroxypropyl)(2-hydroxyethyl)amino]ethyl]isostearamide
N-[2-[(2,3-dihydroxypropyl)(2-hydroxyethyl)amino]ethyl]myristoleamide
N-[2-[(2,3-dihydroxypropyl)(2-hydroxyethyl)amino]ethyl]palmitoleamide
N-[2-[(2,3-dihydroxypropyl)(2-hydroxyethyl)amino]ethyl]oleamide
N-[2-[(2,3-dihydroxypropyl)(2-hydroxyethyl)amino]ethyl]linoleamide
N-[3-[(2,3-dihydroxypropyl)(3-isotridecyloxypropyl)amino]propyl]lauramide
N-[3-[(2,3-dihydroxypropyl)(3-isotridecyloxypropyl)amino]propyl]myristamide
N-[3-[(2,3-dihydroxypropyl)(3-isotridecyloxypropyl)amino]propyl]palmitamide
N-[3-[(2,3-dihydroxypropyl)(3-isotridecyloxypropyl)amino]propyl]stearamide
N-[3-[(2,3-dihydroxypropyl)(3-isotridecyloxypropyl)amino]propyl]isostearamide
N-[3-[(2,3-dihydroxypropyl)(3-isotridecyloxypropyl)amino]propyl]myristoleamide
N-[3-[(2,3-dihydroxypropyl)(3-isotridecyloxypropyl)amino]propyl]palmitoleamide
N-[3-[(2,3-dihydroxypropyl)(3-isotridecyloxypropyl)amino]propyl]oleamide
N-[3-[(2,3-dihydroxypropyl)(3-isotridecyloxypropyl)amino]propyl]linoleamide
N-[3-[(2,3-dihydroxypropyl)(3-butyloxypropyl)amino]propyl]lauramide
N-[3-[(2,3-dihydroxypropyl)(3-butyloxypropyl)amino]propyl]myristamide
N-[3-[(2,3-dihydroxypropyl)(3-butyloxypropyl)amino]propyl]palmitamide
N-[3-[(2,3-dihydroxypropyl)(3-butyloxypropyl)amino]propyl]stearamide
N-[3-[(2,3-dihydroxypropyl)(3-butyloxypropyl)amino]propyl]isostearamide
N-[3-[(2,3-dihydroxypropyl)(3-butyloxypropyl)amino]propyl]myristoleamide
N-[3-[(2,3-dihydroxypropyl)(3-butyloxypropyl)amino]propyl]palmitoleamide
N-[3-[(2,3-dihydroxypropyl)(3-butyloxypropyl)amino]propyl]oleamide
N-[3-[(2,3-dihydroxypropyl)(3-butyloxypropyl)amino]propyl]linoleamide
N-[3-[(2,3-dihydroxypropyl)(3-octyloxypropyl)amino]propyl]lauramide
N-[3-[(2,3-dihydroxypropyl)(3-octyloxypropyl)amino]propyl]myristamide
N-[3-[(2,3-dihydroxypropyl)(3-octyloxypropyl)amino]propyl]palmitamide
N-[3-[(2,3-dihydroxypropyl)(3-octyloxypropyl)amino]propyl]stearamide
N-[3-[(2,3-dihydroxypropyl)(3-octyloxypropyl)amino]propyl]isostearamide
N-[3-[(2,3-dihydroxypropyl)(3-octyloxypropyl)amino]propyl]myristoleamide
N-[3-[(2,3-dihydroxypropyl)(3-octyloxypropyl)amino]propyl]palmitoleamide
N-[3-[(2,3-dihydroxypropyl)(3-octyloxypropyl)amino]propyl]oleamide
N-[3-[(2,3-dihydroxypropyl)(3-octyloxypropyl)amino]propyl]linoleamide
N-[3-[(2,3-dihydroxypropyl)(3-decyloxypropyl)amino]propyl]lauramide
N-[3-[(2,3-dihydroxypropyl)(3-decyloxypropyl)amino]propyl]myristamide
N-[3-[(2,3-dihydroxypropyl)(3-decyloxypropyl)amino]propyl]palmitamide
N-[3-[(2,3-dihydroxypropyl)(3-decyloxypropyl)amino]propyl]stearamide
N-[3-[(2,3-dihydroxypropyl)(3-decyloxypropyl)amino]propyl]isostearamide
N-[3-[(2,3-dihydroxypropyl)(3-decyloxypropyl)amino]propyl]myristoleamide
N-[3-[(2,3-dihydroxypropyl)(3-decyloxypropyl)amino]propyl]palmitoleamide
N-[3-[(2,3-dihydroxypropyl)(3-decyloxypropyl)amino]propyl]oleamide
N-[3-[(2,3-dihydroxypropyl)(3-decyloxypropyl)amino]propyl]linoleamide
N-[2-[(2,3-dihydroxypropyl)(3-decyloxypropyl)amino]ethyl]oleamide
N-[3-[(2,3-dihydroxypropyl)(2-decyloxyethyl)amino]propyl]oleamide N-[2-[(2,3-dihydroxypropyl)(3-hydroxypropyl)amino]
  ethyl]oleamide
N-[3-[(2,3-dihydroxypropyl)(2-hydroxyethyl)amino]pro-
  pyl]oleamide
N-[2-[(2,3-dihydroxypropyl)(3-decyloxypropyl)amino]
  ethyl]isostearamide
N-[3-[(2,3-dihydroxypropyl)(2-decyloxyethyl)amino]pro-
  pyl]isostearamide
N-[2-[(2,3-dihydroxypropyl)(3-hydroxypropyl)amino]
  ethyl]isostearamide
N-[3-[(2,3-dihydroxypropyl)(2-hydroxyethyl)amino]pro-
  pyl]isostearamide The following three-step procedure is a general, representative example for the preparation of the class of compounds described in the present invention: 664 mmol of oleic acid is added to a 3-neck flask fitted with a temperature probe, mechanical stirrer, and distillation trap fitted with a condenser. To the flask is added 664 mmol of 2-aminoethylethanolamine and the reaction is placed under a nitrogen atmosphere. The reaction is heated to 150° C. and the generated water is collected in the distillation trap. After heating for approximately 6 hrs, the reaction is cooled and the product amide is used directly in the next step without purification.

271 mmol of the product from the previous step is added to a 3-neck flask fitted with a temperature probe and mechanical stirrer. 275 mL of ethanol is added to the flask and a reflux condenser is attached. A solution consisting of 258 mmol of glycidol in 70 mL of ethanol is prepared and transferred to an addition funnel with a nitrogen inlet attached atop the reflux condenser. The reaction is placed under nitrogen atmosphere and heated to reflux (approximately 80° C.). The solution of glycidol is added dropwise to the flask over 30 min. After the addition is complete, the reaction is refluxed for an additional 6 hrs. The reaction was concentrated via rotary evaporation until all of the ethanol is removed to yield the 2,3-dihydroxypropyl adduct.

The product from the previous step is added to a 3-neck flask fitted with a temperature probe and mechanical stirrer. Water is added and the reaction is placed under an atmosphere of nitrogen and heated to 100-130° C. Boric acid is added and the reaction is heated until all of the boron is digested. A small amount of an antifoaming agent is added and the reaction is heated to 135° C. under vacuum to remove water. Process oil is then added to the reaction mixture which is stirred briefly before hot-filtering through a pad of diatomaceous earth to yield the final organoboron product.

In carrying out the above reactions, a variety of starting materials may be used as depicted in General Reaction Scheme I. In the first step, a carbonyl-containing compound such as a carboxylic acid, carboxylic acid ester, or triglyceride is used. For carboxylic acids, the $R^1$ group consisting of 1 to 21 carbon atoms can be a linear, cyclic, or branched saturated hydrocarbon or an unsaturated and/or polyunsaturated hydrocarbon or mixtures thereof. For carboxylic acid esters, the $R^1$ group consisting of 1 to 21 carbon atoms can be a linear, cyclic, or branched saturated hydrocarbon or an unsaturated and/or polyunsaturated hydrocarbon or mixtures thereof. For triglycerides, the $R^1$ group consisting of 1 to 21 carbon atoms can be a linear, cyclic, or branched saturated hydrocarbon or an unsaturated and/or polyunsaturated hydrocarbon or mixtures thereof. For the reaction of a carboxylic acid or carboxylic acid ester with the primary amine-containing compound, the reaction stoichiometry is typically 1.0 mole of carboxylic acid or carboxylic acid ester to 1.0 mole of the primary amine-containing compound to produce the desired secondary amide. Slight excesses of the carboxylic acid or carboxylic acid ester, or the primary amine-containing compound may be used but are generally not necessary nor preferred. Preferred carboxylic acid esters are fatty acid methyl esters (FAME's) and fatty acid ethyl esters, also referred to as biodiesel. Sources of biodiesel are the fatty oils described below. For the reaction of a triglyceride with the primary amine-containing compound, the reaction stoichiometry can be varied such that 1.0 mole of triglyceride is reacted with 1.0 to 3.0 mole of the primary amine-containing compound to produce the desired secondary amide and/or a mixture of the desired secondary amide with the corresponding mono- and dialkylglycerates. The carbon chains in the above examples of carbonyl-containing compounds can be derived from fatty oils such as coconut oil, hydrogenated coconut oil, fish oil, hydrogenated fish oil, tallow, hydrogenated tallow, corn oil, rapeseed oil, cottonseed oil, olive oil, palm oil, peanut oil, safflower oil, sesame oil, sunflower oil, canola oil, and soy bean oil. For the mixed primary/secondary amine-containing compound, the $R^2$ group can be a hydrogen atom or a linear, cyclic, or branched hydrocarbon chain containing 1 to 20 carbon atoms or mixtures thereof and the number of methylene spacer groups (n and m) can each vary independently from 1 to 5. In the final step, the boron source can be boric acid or an alkyl borate ester (for example, triethyl borate, tripropyl borate, tributyl borate, tripentyl borate, trihexyl borate, triheptyl borate, trioctyl borate, $R^3$=a hydrogen atom or a linear, cyclic, or branched hydrocarbon chain containing 1 to 20 carbon atoms or mixtures thereof). It is preferred that the boron source is boric acid. Methods of producing trialkyl borates are described in U.S. Pat. Nos. 1,668,797 and 2,642,453.

Individual compounds from the inventive class of molecules can be used as additives in lubricants for friction reduction and/or supplemental wear protection at a treat rate from 0.01-5.00 wt. % of the additive, or 10 ppm to 1000 ppm based on the amount of boron in the additive delivered to the lubricant. Furthermore, these compounds can be used in combination with other additives such as dispersants, detergents, viscosity modifiers, antioxidants, other friction modifiers, anti-wear agents, corrosion inhibitors, rust inhibitors, salts of fatty acids (soaps), and extreme pressure additives.

Dispersants that may be used include polyisobutylene mono-succinimide dispersants, polyisobutylene di-succinimide dispersants, polypropylene mono-succinimide dispersants, polypropylene di-succinimide dispersants, ethylene/propylene copolymer mono-succinimide dispersants, ethylene/propylene copolymer di-succinimide dispersants, Mannich dispersants, dispersant antioxidant olefin copolymers, low molecular weight ethylene propylene succimimide dispersants, carboxylic dispersants, amine dispersants, boronated dispersants, and molybdenum containing dispersants.

Detergents that may be used include neutral calcium sulfonate detergents, neutral magnesium sulfonate detergents, overbased calcium sulfonate detergents, overbased magnesium sulfonate detergents, neutral calcium phenate detergents, neutral magnesium phenate detergents, overbased calcium phenate detergents, overbased magnesium phenate detergents, neutral calcium salicylate detergents, neutral magnesium salicylate detergents, overbased calcium salicylate detergents, overbased magnesium salicylate detergents, sodium sulfonate detergents, and lithium sulfonate detergents Any type of polymeric viscosity index modifier may be used. Examples include polymers based on olefin copolymers (OCPs), polyalkylmethacrylates (PAMAs), polyisobutylenes (PIBs), styrene block polymers (such as styrene isoprene, styrene butadiene), and ethylene alpha-olefin copolymers.

Molybdenum-based friction modifiers may be used to supplement or enhance the overall performance of the class of compounds in this invention. Examples of the types of alternative friction modifiers that may be used include mononuclear molybdenum dithiocarbamates, dinuclear molybdenum dithiocarbamates, trinuclear molybdenum dithiocarbamates, sulfurized oxymolybdenum dithiocarbamates, sulfur- and molybdenum-containing compounds, molybdenum phosphorodithioates, sulfurized oxymolybdenum dithiophosphates, tetraalkylammonium thiomolybdates, molybdenum xanthates, molybdenum thioxanthates, imidazolium oxythiomolybdate salts, and quaternary ammonium oxythiomolybdate salts. Typical treat rates for molybdenum-based friction modifiers range from 50 ppm to 800 ppm of delivered molybdenum to the finished lubricant formulation.

It is preferred that additives such as glycerol monooleate and organic friction modifiers derived from fatty oils and diethanolamine are not present because, as will be demonstrated, these types of organic friction modifiers are highly corrosive to copper and lead as determined by the high temperature corrosion bench test (HTCBT, ASTM D6594).

Preferred anti-wear additives that may be used include primary and/or secondary zinc dialkyldithiophosphate (ZDDP), triphenylphosphorothioates, dialkylphosphoric acid amine salts, monoalkylphosphoric acid amine salts, dialkyldithiophosphate succinates, dithiophosphoric ester or carboxylic acids, trialkylborate esters, borate esters of fatty acid derivatives, and methylenebis (dibutyldithiocarbamate).

Preferred antioxidants that may be used include dinonyldiphenylamine, monononyldiphenylamine, dioctyldiphenylamine, monooctyldiphenylamine, butyloctyldiphenylamine, monobutyldiphenylamine, dibutyldiphenylamine, nonylated phenyl-alpha-naphthylamine octylated phenyl-alpha-naphthylamine, dodecylated phenyl-alpha-naphthylamine, 2,6-di-tert-butylphenol, butylated hydroxytoluene, 4,4-methylenebis (2,6-di-tert-butylphenol), octadecyl-3-[3,5-di-tert-butyl-4-hydroxyphenyl]propionate, isotridecyl-3-[3,5-di-tert-butyl-4-hydroxyphenyl]propionate, 2-ethylhexyl-3-[3,5-di-tert-butyl-4-hydroxyphenyl]propionate, isooctyl-3-[3,5-di-tert-butyl-4-hydroxyphenyl]propionate, and thiodiethylene bis [3-(3,5-di-tert-butyl-4-hydroxyphenyl) propionate].

Preferred corrosion and rust inhibitors that may be used include ethoxylated phenols, alkenylsuccinic acids, polyalkylene glycols, derivatives of benzotriazole, derivatives of tolutriazole, derivatives of triazole, dimercaptothiadiazole derivatives, fatty acid derivatives of 4,5-dihydro-1H-imidazole, neutral calcium dinonylnaphthalene sulfonates, neutral zinc dinonylnaphthalene sulfonates, and neutral alkaline earth sulfonates.

Preferred extreme pressure additives that may be used include sulfurized isobutylene, sulfurized alpha-olefins, aliphatic amine phosphates, aromatic amine phosphates, dimercaptothiadiazole derivatives, zinc dialkyldithiocarbamates, dialkylammonium dialkyldithiocarbamates, and antimony dialkyldithiocarbamates.

Treat levels for all the above-mentioned additives can vary significantly depending upon the application, additive solubility, base fluid type, and finished fluid performance requirements. Typical treat levels usually vary from 0.05 wt. % to 10.00 wt. % based on the type of finished lubricant being developed. Base fluids may include petroleum-based or synthetic stocks including any fluid that falls into the API base stock classification as Group I, Group II, Group III, Group IV, and Group V. Synthetic fluids include poly-α-olefins, polyols, esters, bio-based lubricants, and any combination of these. The lubricant base or oil is present in at least 80% of the total lubricating composition.

Examples of the types of finished lubricants that may be developed using the additives of this invention include, gasoline engine oils, heavy duty diesel engine oils, natural gas engine oils, medium speed diesel (railroad and marine) engine oils, off-road engine oils, two-stroke and four-stroke motorcycle engine oils, hybrid vehicle engine oils, tractor oils, automotive racing oils, hydraulic fluids, automatic and manual transmission fluids, industrial and engine gear oils, and greases.

What is claimed is:

1. A borate ester represented by the following formula:

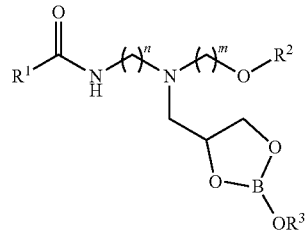

where $R^1$ is a hydrocarbon chain, $R^2$ and $R^3$ are independently either a hydrogen atom or a hydrocarbon chain, and m and n are independently from 1 to 5.

2. The borate ester according to claim 1, being a reaction product of a boron source and at least one of the following:
   N-[2-[(2,3-dihydroxypropyl)(2-hydroxyethyl)amino] ethyl]alkaneamide
   N-[2-[(2,3-dihydroxypropyl)(2-hydroxyethyl)amino] ethyl]isostearamide
   N-[2-[(2,3-dihydroxypropyl)(2-hydroxyethyl)amino] ethyl]cocoamide
   N-[2-[(2,3-dihydroxypropyl)(2-hydroxyethyl)amino] ethyl]oleamide
   N-[3-[(2,3-dihydroxypropyl)(3-alkyloxypropyl)amino] propyl]alkaneamide
   N-[3-[(2,3-dihydroxypropyl)(3-alkyloxypropyl)amino] propyl]isostearamide
   N-[3-[(2,3-dihydroxypropyl)(3-alkyloxypropyl)amino] propyl]cocoamide
   N-[3-[(2,3-dihydroxypropyl)(3-alkyloxypropyl)amino] propyl]oleamide.

3. The borate ester according to claim 1, being a reaction product of a carboxylic acid or ester with 2-aminoethylethanolamine and glycidol; and a boron source.

4. The borate ester according to claim 3 where the boron source is boric acid.

5. The borate ester according to claim 3 where the boron source is a trialkyl borate.

6. The borate ester according to claim 1, which is a reaction product of a carboxylic acid or ester and one of (i) alkyloxypropyl-1,3-diaminopropane, (ii) alkyloxypropyl-1,3-diaminopropane, (iii) alkyloxyethyl-1,3-diaminopropane and (iv) alkyloxypropyl-1,2-diaminoethane; and glycidol; and a boron source.

7. The borate ester according to claim 1, which is a reaction product of oleic acid or an ester of oleic acid with 2-aminoethyl-ethanolamine and glycidol, and a boron source.

8. The borate ester according to claim 6, wherein the carboxylic acid or ester is oleic acid or an ester of oleic acid.

9. A lubricating composition comprising a major amount of lubricating base fluid and a borate ester according to claim 1, wherein the borate ester is present in the composition in an amount sufficient to provide about 50-1000 ppm boron to the composition.

10. A method for preparing a borate ester compound, comprising the steps of, in order:
reacting a carbonyl-containing compound chosen from the group consisting of carboxylic acid, carboxylic acid ester, or triglyceride; with a mixed primary/secondary amine-containing compound to form a secondary amide;
reacting the secondary amide with glycidol to furnish a 2,3-dihydroxypropyl glycidol adduct; and
reacting the 2,3-dihydroxypropyl glycidol adduct with a boron source in the presence of water.

11. The method of claim 10, wherein the amine-containing compound is chosen from the group consisting of: (i) alkyloxypropyl-1,3-diaminopropane, (ii) alkyloxypropyl-1,3-diaminopropane, (iii) alkyloxyethyl-1,3-diaminopropane and (iv) alkyloxypropyl-1,2-diaminoethane; the boron source is boric acid or trialkyl borate.

12. The method of claim 10, wherein the carbonyl-containing compound is oleic acid, the amine-containing compound is 2-aminoethyl-ethanolamine, and the boron source is boric acid.

13. The method of claim 10, wherein the 2,3-dihydroxypropyl glycidol adduct is chosen from the group consisting of:
N-[2-[(2,3-dihydroxypropyl)(2-hydroxyethyl)amino]ethyl]alkaneamide
N-[2-[(2,3-dihydroxypropyl)(2-hydroxyethyl)amino]ethyl]isostearamide
N-[2-[(2,3-dihydroxypropyl)(2-hydroxyethyl)amino]ethyl]cocoamide
N-[2-[(2,3-dihydroxypropyl)(2-hydroxyethyl)amino]ethyl]oleamide
N-[3-[(2,3-dihydroxypropyl)(3-alkyloxypropyl)amino]propyl]alkaneamide
N-[3-[(2,3-dihydroxypropyl)(3-alkyloxypropyl)amino]propyl]isostearamide
N-[3-[(2,3-dihydroxypropyl)(3-alkyloxypropyl)amino]propyl]cocoamide
N-[3-[(2,3-dihydroxypropyl)(3-alkyloxypropyl)amino]propyl]oleamide.

* * * * *